Oct. 19, 1948.  W. S. DIEHL  2,451,479
AIRFLOW STABILIZER
Filed April 28, 1945  2 Sheets-Sheet 1
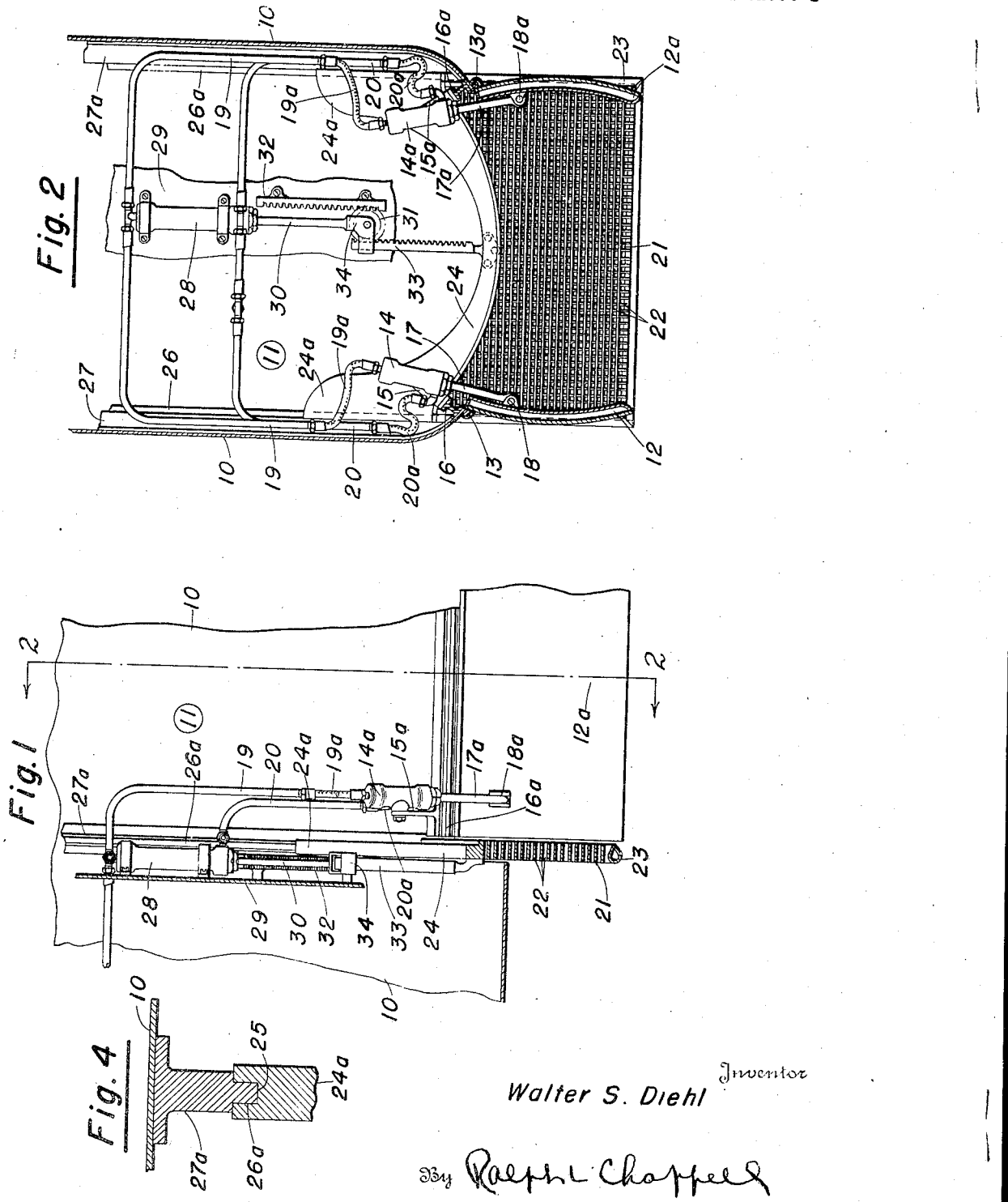
Walter S. Diehl Inventor
By Ralph L Chappell
Attorney

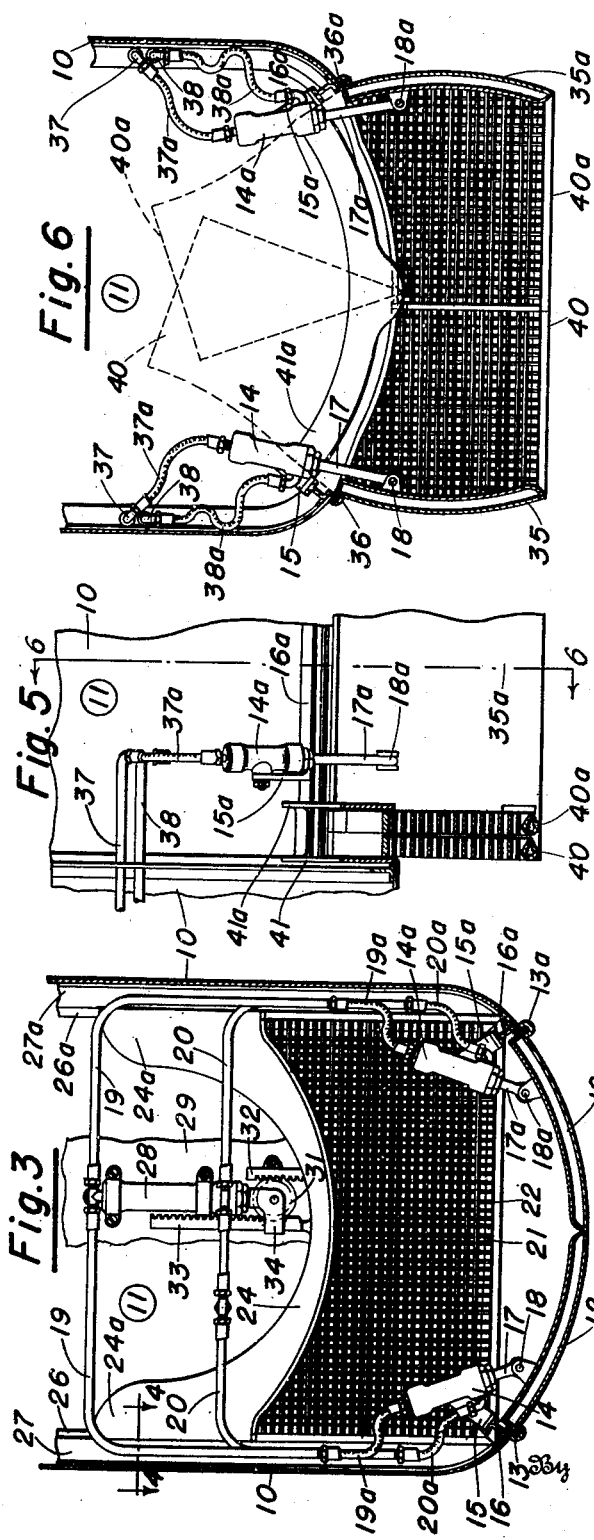

Patented Oct. 19, 1948

2,451,479

UNITED STATES PATENT OFFICE 2,451,479

AIRFLOW STABILIZER

Walter S. Diehl, United States Navy

Application April 28, 1945, Serial No. 590,853

12 Claims. (Cl. 244—130)

(Granted under the act of March 3, 1883, as amended April 30, 1928; 370 O. G. 757)

The present invention relates to new and useful improvements in aircraft and more particularly to new and useful improvements in means for reducing air turbulence and smoothing the airflow at desired locations on the aircraft.

In many cases, it is of paramount importance to reduce air turbulence at certain points on an aircraft. For instance, in offensive use of airplanes, efforts are made to maintain aerodynamic qualities of minimum resistance to airflow by carrying the armament load, such as bombs, torpedoes or the like, in a compartment or bomb bay which is closed by bomb bay doors until approaching the target area. Heretofore, when the bomb bay doors are opened prior to attack, experience and tests have shown that the normal airflow is materially disturbed and that violent air currents and general air turbulence are set up in and around the bomb bay. This condition of violent and sudden changes in velocity and direction of the airstream is occasioned by exposing the interior of the bomb compartment when the doors are open. Such conditions cause inaccuracy in bombing as the load is released and furthermore, serious accidents are apt to be caused by erratic action of the bombs.

With the foregoing in mind, one of the principal objects of the present invention is to overcome the above and other difficulties by smoothing out the airflow in and around the bomb bay when the doors are open.

Another object of the invention is to substantially eliminate turbulent air currents normally set up in a compartment which is open to the adjacent airstream.

A further object of the invention is to increase accuracy in releasing loads from aircraft by smoothing out air currents which would generally be set up around the load.

A still further object of the invention is to provide a device operating as a screening grid so located with respect to the bomb bay as to prevent any substantial air turbulence when the doors are open.

The invention still further aims to provide a relatively simple and easily operated arrangement which will effectively accomplish the above and other purposes of the invention as will hereinafter become apparent.

The above and other objects of the invention will in part be obvious and will be hereinafter more fully pointed out.

In the accompanying drawings:

Fig. 1 is a fragmentary longitudinal section through the fuselage showing the bomb bay doors open and the grid extended.

Fig. 2 is a transverse section taken along the line 2—2 of Fig. 1.

Fig. 3 is a transverse section, similar to Fig. 2, but showing the bomb bay doors closed and the grid retracted.

Fig. 4 is an enlarged fragmentary detail section taken along the line 4—4 of Fig. 3, showing the connection between the grid and guide rail.

Fig. 5 is a fragmentary longitudinal section, similar to Fig. 1, but showing a modified form of grid in extended position with the doors open.

Fig. 6 is a transverse section taken along the line 6—6 of Fig. 5, the dotted lines indicating the retracted position of the grid.

Fig. 7 is a fragmentary end view showing a honeycomb type of grid.

Fig. 8 is a longitudinal section of Fig. 7.

Fig. 9 is a fragmentary end view showing a tubular type of grid.

Fig. 10 is a longitudinal section of Fig. 9.

Fig. 11 is a fragmentary end view showing a grid in the form of a punched plate.

Fig. 12 is a longitudinal section of Fig. 11.

Fig. 13 is a fragmentary end view showing the form of grid illustrated in Figs. 1 through 6.

Fig. 14 is a longitudinal section of Fig. 13.

Fig. 15 is a fragmentary perspective view showing a grid in the form of wire mesh.

In the accompanying drawings, certain forms of the invention have been shown for purposes of illustration, it being clearly understood, however, that the illustrated details of construction and specifically described operations are not to be considered as limiting the concept of the invention. In general, the invention contemplates the provision of an aircraft having a compartment, such as a bomb bay, from which a load is adapted to be dropped during flight. A grid, grille or other structure presenting a perforate boundary to the airstream is adapted to be disposed exteriorly of the aircraft and positioned relative to the compartment in such a manner that the usual air turbulence set up in and around the compartment is substantially eliminated. The grid acts to smooth out the air flow by suppressing rapid changes in the velocity and direction thereof.

Referring more in detail to Figs. 1 through 4 of the accompanying drawings, a portion of the fuselage 10 of the aircraft is illustrated and a portion of the bomb bay 11 or other compartment is shown in connection therewith. Closure means for the bomb bay or other compartment in the form mating doors 12, 12a are hingedly connected to the fuselage, as at 13, 13a, respectively. Any conventional type of mechanism for operating the doors may be provided, such as manual, electric, hydraulic or other means. For convenience, however, hydraulic mechanism is shown for operating the doors and this mechanism includes a pair of hydraulic cylinders 14, 14a pivotally mounted on brackets 15, 15a, respectively, which are mounted on longitudinal frame members 16, 16a, respectively, of the fuselage. Pistons 17, 17a operating in the cylinders 14, 14a, respectively, are pivotally connected, as at 18, 18a, respectively, to the doors 12, 12a, respectively. Fluid pressure lines 19 and 20 connected to opposite ends of the cylinders 14, 14a, respectively, are in communication with a suitable motor (not shown) which may be remotely controlled by the pilot or other occupant. The pressure lines are provided with flexible portions 19a, 20a at the cylinders permitting the required pivotal movement of the cylinders and pistons.

A grid 21 in the form of a built up screen of crossed vertical and horizontal plates 22, such as shown in Figs. 13 and 14, is secured within a substantially rectangular boundary framework 23 which is mounted on a supporting guide frame 24 having recesses 25 (see Fig. 4) in the vertical elongated end portions 24a thereof. These recesses are adapted to receive guide rails 26, 26a which project inwardly from vertical frame members 27, 27a, respectively, in order to provide a guiding mechanism for the grid. The grid itself may be offset slightly to permit this sliding and guided movement along the rails. A hydraulic cylinder 28 is suitably mounted on a transverse partition 29 at one end of the compartment above the grid. A piston 30 operates in the cylinder 29 and carries a pinion gear 31 at the outer end thereof. This gear 31 engages and travels over racks 32 and 33 upon movement of the piston. The rack 32 is fixedly mounted on the partition 29 and the rack 33 is fixed to the supporting guide frame 24. The supporting means for the gear 31 includes a laterally extending apertured bracket 34 embracing the rack 33 and permitting relative guided movement therebetween upon operation of the piston. Opposite ends of the cylinder 29 are in communication with the fluid pressure lines 19 and 20, respectively, so that the grid will be operated in unison with the doors, although it is to be understood that separate and independent operation may be effected, if desired, in various ways, as by employing separate fluid pressure systems for operating the grid and the doors.

In a modified form of the invention, as shown in Figs. 5 and 6, the mating doors 35, 35a for closing the bomb bay 11 or other compartment are illustrated as being operated by hydraulic means similar to that shown in Figs. 1 through 3. Thus, the doors are hingedly mounted on the fuselage, as at 36, 36a, and the hydraulic cylinders 14, 14a are pivotally mounted on brackets 15, 15a, respectively. The pistons 17, 17a operating in the cylinders are pivotally mounted, as at 18, 18a to the doors 35, 35a, respectively, so that movement of the pistons in the cylinders will effect corresponding opening and closing movements of the doors. Fluid conduits 37 and 38 are connected to opposite ends of the cylinders by flexible conduit portions 37a, 38a permitting free pivotal movement of the cylinders. In this form of the invention, the screening or grid device is directly connected to the closure means for movement therewith. Thus, the screening device includes a pair of grids 40, 40a connected to and carried by the doors 35, 35a, respectively, in any suitable manner. As illustrated, the grids are mounted on the doors in such a manner that the adjacent free edges thereof slightly overlap when the doors are in open positions, and will assume the dotted line positions (see Fig. 6) when the doors are closed. Suitable guide plates 41, 41a may be provided to form a guiding channel for the guide in order to assist in maintaining the same in proper relative positions. In this case, too, fluid under pressure for the cylinders may be furnished from any suitable source, such as a motor, which may be remotely and selectively controlled in known manner.

Various modified forms of grid structure are suggested in Figs. 7 through 15. Thus, in Figs. 7 and 8, the grid is made of a plurality of non-circular conduit sections 42 which are preferably hexagonal in cross-section and fitted together to form a honeycomb structure. In Figs. 9 and 10, the grid structure consists of a plurality of tube sections 43 connected together to form the boundary. In Figs. 11 and 12, the grid structure is illustrated in the form of a metal sheet 44 having punched openings 45 therethrough. In order to reduce drag effects, the individual punched wall portions 44a are extended rearwardly around each opening, the forward surfaces thereof being rounded. The structure of Figs. 13 and 14 is that shown in Figs. 1 through 6 and, as previously indicated, includes a plurality of vertical and horizontal plates 22 secured together to form the grid structure. As a still modified form, a mesh screen 46 secured to a boundary framework 47 may be employed as the grid structure.

In operation, reference being had to Figs. 1 through 4 of the accompanying drawings, and assuming the doors 12, 12a to be closed as shown in Fig. 3, opening of the doors is under control of the pilot or other occupant who, at the desired time, may operate the control mechanism to admit fluid under pressure through the pressure lines 19 to the upper ends of the cylinders 14, 14a and 28. The pistons 17, 17a and 30 in the respective cylinders will thus be urged downwardly and the doors 12, 12a will be opened outwardly about the pivot points and the grid 21 will also be urged downwardly along the rails 26 to extended position disposed immediately in advance of the forward edges of the doors and extending between the door edges in full open position, as shown in Fig. 2. As previously pointed out, the grid or other perforate boundary operates to smooth and straighten the airstream over the boundary and between the opened doors so as to reduce to a minimum or substantially eliminate air turbulence therein and also within the compartment or bomb bay. In this manner, the bombs or other load to be released are not subjected to disturbing influences of unstable airflow. After release of the load, the control mechanism may be operated to reverse the flow of fluid under pressure so that the fluid will be directed into the opposite ends of the cylinders through lines 20 so that the pistons will be urged inwardly of the cylinders, thus closing the doors and retracting the grid to a housed position within the fuselage. In this form of the invention, the grid is actuated independently of the doors but in unison therewith. However, it is to be clearly understood that the grid may be actuated by entirely separate control mechanism without regard to operation of the doors or, still further, the grid may be caused to move between extended and retracted positions by interconnection with the doors, such as by a lever and linkage system or the like.

Operation of the doors in the form of the invention shown in Figs. 5 and 6, is the same as described in connection with Figs. 1 through 4 but in this arrangement, the grid means is in the form of two cooperating apertured boundaries 40, 40a, one suitably attached to and carried by each door. Thus, when the doors are moved, the grids are carried thereby from the dotted line position of Fig. 6 to the full line extended position thereof.

Because of drag effects, the elongated types of grids or honeycombs may operate more efficiently than the types of Figs. 11 and 15. Satisfactory results are obtained with a honeycomb type of grid having a depth of from two to four times the diameter of the openings but such proportions can be varied as desired for particular installations. However, in each of the illustrated forms of the invention, the action of the grid or perforate boundary is substantially the same although some may operate more effectively than others. When the grid is properly positioned relative to the compartment; for instance, adjacent the forward end thereof, as illustrated, it operates to regulate the air flow by stabilizing the flow in and around the bomb bay. Thus, violent and rapid changes in direction and velocity of the air flow, such as are characteristic of unstable flow, are smoothed out as the grid tends to suppress or control such air movements and to redistribute the velocity over the entire boundary cross section by reason of the retarding action of the grid on zones of excess velocity. In other words, the grid is effective in reducing variations of wind velocity and local excess velocities, and in suppressing local accelerations or rotations of the airstream as a whole.

While certain modified forms of the invention have been shown for purposes of illustration, it is to be clearly understood that various changes in the details of construction, arrangement of parts, and modes of operation may be effected without departing from the spirit of the invention or the scope thereof as set forth in the appended claims considered in conjunction with the specification.

The invention described herein may be manufactured and used by or for the Government of the United States of America for governmental purposes without the payment of any royalties thereon or therefor.

What I claim is:

1. In aircraft having a compartment adapted to be opened to the atmosphere and a closure therefor, airflow stabilizing means adapted to be positioned in the airstream adjacent the forward end of said compartment for substantially eliminating air turbulence in and around said compartment when the closure is open, and means for extending and retracting said stabilizing means into and out of the airstream.

2. In aircraft having a compartment adapted to be opened to the atmosphere and closure means therefor, airflow stabilizing means adapted to be positioned in the airstream adjacent the forward end of said compartment for substantially eliminating air turbulence in and around said compartment, and means for extending and retracting said stabilizing means into and out of the airstream in unison with opening and closing of the closure means.

3. In aircraft having a compartment adapted to be opened to the atmosphere and closure means therefor, an apertured grid member connected to the aircraft for movement from a housed position within the aircraft to an extended position in the airstream adjacent the forward end of said compartment for substantially eliminating air turbulence in and around said compartment when the closure means is open, and means under control of the operator for shifting said grid member between housed and extended positions as the closure means is in closed or open position.

4. In aircraft, means providing a bomb bay, closure means for the bomb bay, airflow straightening grid means disposed adjacent the forward edge of said closure means, and means for extending and retracting said grid means according to the open or closed position of said closure means.

5. In aircraft, means providing a bomb bay, closure means for the bomb bay, airflow straightening grid means disposed adjacent the forward end of said bomb bay, and means for extending and retracting said grid means simultaneously with opening and closing of said closure means.

6. In aircraft, means providing a bomb bay, mating doors for said bomb bay, airflow straightening grid means adapted to be disposed across the space between the open doors at the forward ends thereof, and means for extending and retracting said grid means according to the closing and opening of said doors.

7. In aircraft, means providing a bomb bay, closure means for the bomb bay, and airflow straightening grid means carried by said closure means adjacent the forward end of said bomb bay for substantially eliminating air turbulence therein when the closure means are open.

8. In aircraft, means providing a bomb bay, closure means for the bomb bay including mating doors, and grid means carried by each of said doors adjacent the forward end of said bomb bay and extending across the doors when open for reducing air turbulence in and around the said bomb bay.

9. In aircraft, means providing a bomb bay, closure means for the bomb bay including mating doors pivoted longitudinally of said aircraft, grid members one carried by each of said doors adjacent the forward ends thereof with adjacent edges slightly overlapping in open position and extending between said doors to reduce air turbulence in and around the said bomb bay, and means for operating said closure means.

10. In aircraft, means providing a bomb bay, closure means for the bomb bay including mating doors pivoted longitudinally of said aircraft, grid members one carried by each of said doors adjacent the forward ends thereof with adjacent edges slightly overlapping in open position and extending between said doors to reduce air turbulence in and around the said bomb bay, means for operating said closure means, and means for guiding the edges of said grid members during movements of the closure means.

11. In aircraft, means providing a bomb bay, closure means for the bomb bay, airflow straightening means in the form of an apertured boundary having a frame, means for mounting the frame adjacent the forward end of the bomb bay for guided sliding movement between a retracted housed position within the aircraft and an extended position in the airstream for substantially eliminating air turbulence in and around the bomb bay, means for operating said closure means, and means for positioning said airflow straightening means.

12. In aircraft, means providing a bomb bay, closure means for the bomb bay, airflow straightening means in the form of an apertured boundary having a frame, means for mounting the frame adjacent the forward end of the bomb bay for guided sliding movement between a retracted housed position within the aircraft and an extended position in the airstream for substantially eliminating air turbulence in and around the bomb bay, and means for extending and retracting said airflow straightening means in unison with opening and closing of said closure means.

WALTER S. DIEHL.

REFERENCES CITED

The following references are of record in the file of this patent:

UNITED STATES PATENTS

| Number | Name | Date |
|---|---|---|
| 2,075,817 | Leorke | Apr. 6, 1937 |
| 2,076,259 | Wright | Apr. 6, 1937 |
| 2,243,906 | Huet | June 3, 1941 |